United States Patent
Neudorf et al.

(10) Patent No.: US 7,588,091 B1
(45) Date of Patent: Sep. 15, 2009

(54) SHANK FOR AN AGRICULTURAL IMPLEMENT

(75) Inventors: Blake Neudorf, Warman (CA); James Henry, Saskatoon (CA)

(73) Assignee: CNH Canada, Ltd. (CA)

( * ) Notice: Subject to any disclaimer, the term of this patent is extended or adjusted under 35 U.S.C. 154(b) by 0 days.

(21) Appl. No.: 12/142,162

(22) Filed: Jun. 19, 2008

(51) Int. Cl.
*A01B 13/08* (2006.01)

(52) U.S. Cl. ........................................ 172/773; 172/699

(58) Field of Classification Search ......... 111/123–126, 111/140, 148; 172/699, 700, 140, 146, 271, 172/196
See application file for complete search history.

(56) References Cited

U.S. PATENT DOCUMENTS

| | | | |
|---|---|---|---|
| 448,861 A | 3/1891 | Hoyt | |
| 1,416,331 A | 5/1922 | Campbell | |
| 1,574,917 A | 3/1926 | Mitchell | |
| 3,196,956 A * | 7/1965 | Ratkowski | 172/713 |
| 3,439,636 A | 4/1969 | Lemke | |
| 3,529,673 A * | 9/1970 | Morris | 172/266 |
| 3,704,753 A * | 12/1972 | Hasforth et al. | 172/700 |
| 4,388,878 A | 6/1983 | Demzin | |
| 4,638,748 A | 1/1987 | Kopecky | |
| 4,765,263 A | 8/1988 | Wilkins | |
| 4,799,823 A * | 1/1989 | Williams | 405/180 |
| 4,911,090 A | 3/1990 | Schimke | |
| 4,932,478 A * | 6/1990 | Jones | 172/699 |
| 5,695,012 A * | 12/1997 | Kesting | 172/699 |
| 5,787,994 A | 8/1998 | Friesen | |
| 6,182,587 B1 | 2/2001 | Lempriere | |
| 6,363,871 B1 | 4/2002 | Puetz et al. | |
| 6,405,665 B1 | 6/2002 | Henry et al. | |
| 6,457,426 B1 | 10/2002 | Cruson | |

* cited by examiner

*Primary Examiner*—Robert E Pezzuto
(74) *Attorney, Agent, or Firm*—Rebecca Henkel

(57) ABSTRACT

A shank having an upper portion and a lower portion with a smaller footprint than the upper portion is designed to be received by a receiver of a tool adapter or boot that is used to couple a tool to the shank. The shank and the adapter have leading edges that are generally equal in which the width so that the leading edge presented at the ground engaging level is not increased by the mounting of the adapter to the shank. The adapter is also configured to interchangeably couple various agricultural tools to the shank, such as sweeps, spikes, and plows.

14 Claims, 5 Drawing Sheets

SHANK FOR AN AGRICULTURAL IMPLEMENT

FIELD OF THE INVENTION

The present invention relates generally to agricultural implements, and in particular, to an edge-on shank and an agricultural tool adapter, such as a seed boot, that enables an agricultural tool, such as a sweep, to be mounted to the shank in a manner that reduces soil disturbance and drag.

BACKGROUND OF THE INVENTION

Agricultural implements are typically towed by a tractor or similar device and include an implement to which a number of shanks are mounted. The shanks are designed to carry an agricultural tool such as a sweep, coulter, spike, or chisel plow. Rather than coupling the tool directly to the shank, increasingly, adapters, also referred to as boots, are being used to mount an agricultural tool to the shank. Some adapters are also designed to receive a seed or fertilizer tube so that product may be dispensed rearward of the tool as the tool passes through the field.

Conventional adapters or boots fit around the outside of the shank thereby increasing the overall width presented at the ground contact level. As a result, any benefit to a shank having a relative narrow leading edge is negated. More particularly, the increased width at the ground engaging level can lead to undesirable soil disturbance and trash flow. In addition, excessive soil disturbance can increase fuel consumption of the tractor as well as increase soil moisture loss, which can negatively impact crop yields.

SUMMARY OF THE INVENTION

The present invention is directed to a shank having an upper portion and a lower portion with a smaller footprint than the upper portion and a tool adapter or boot in which the width of its leading edge is matched to that of the leading edge of the upper portion of the shank. The adapter includes an internal receiver that receives the lower portion of the shank and, as a result, the leading edge presented at the ground engaging level is not increased by the mounting of the adapter to the shank. The adapter is also configured to interchangeably couple various agricultural tools to the shank, such as sweeps, spikes, and plows.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

In the drawings.

DETAILED DESCRIPTION OF THE PREFERRED EMBODIMENTS

Figure 1:
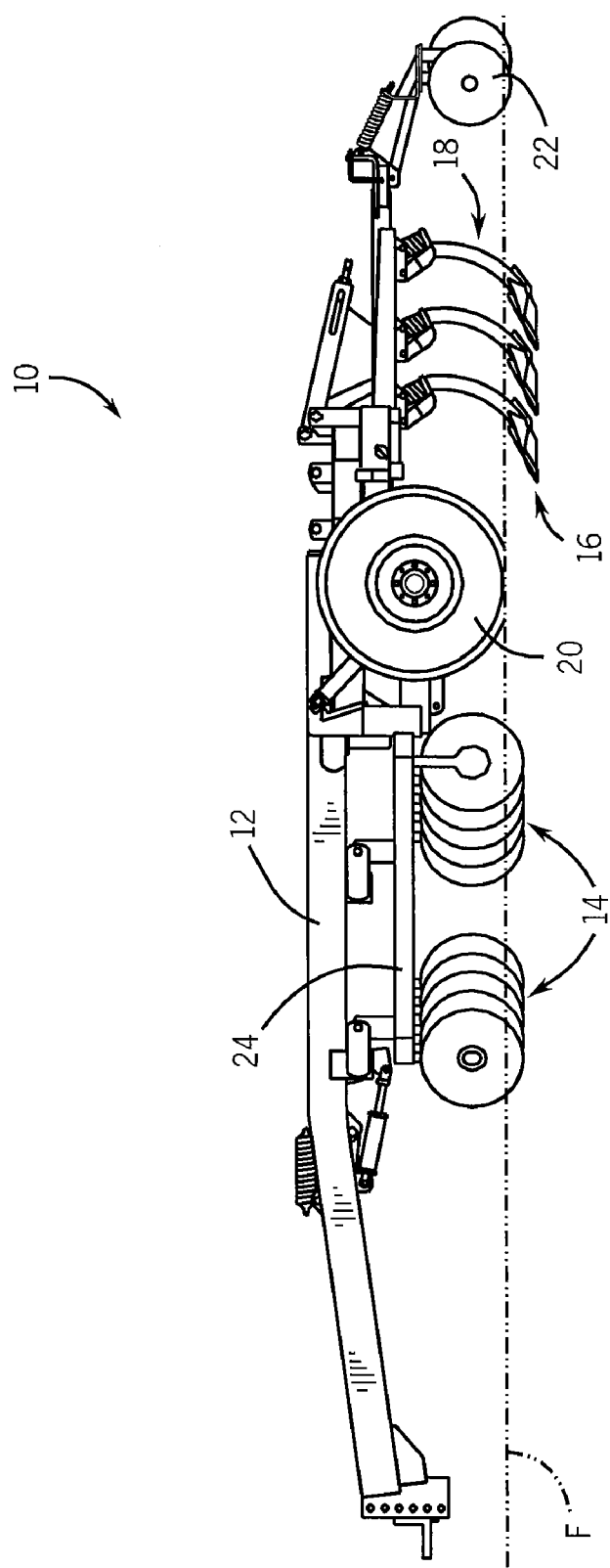
FIG. 1 is a side elevation view of an agricultural implement incorporating the present invention.

FIG. 1 shows an agricultural implement 10 having an implement frame 12 that is towable by a tractor (not shown) or other vehicle as known in the art. The illustrated implement is a combination implement and is thus designed to carry two different kinds of agricultural tools, such as discs 14 and sweeps 16 coupled to shanks 18 that extend downwardly from the implement frame 12. The implement frame 12 is supported above the field F by a wheel assembly 20, as known in the art. A rear disc assembly 22 is also pivotably mounted to the implement frame.

The two sets of discs 14 are coupled to the implement frame 12 by a disc frame 24. As known in the art, the disc frame 24 can be raised and lowered relative to the implement frame to independently control the depth of the discs. Similarly, as known in the art, the sweeps 16 may be raised and lowered independent of the discs 14. The implement frame 12 may also be rotated over the wheel assembly 20 to raise and lower the implement frame 12. It is understood that the present invention is applicable with other types of implement frames.

Figure 2:
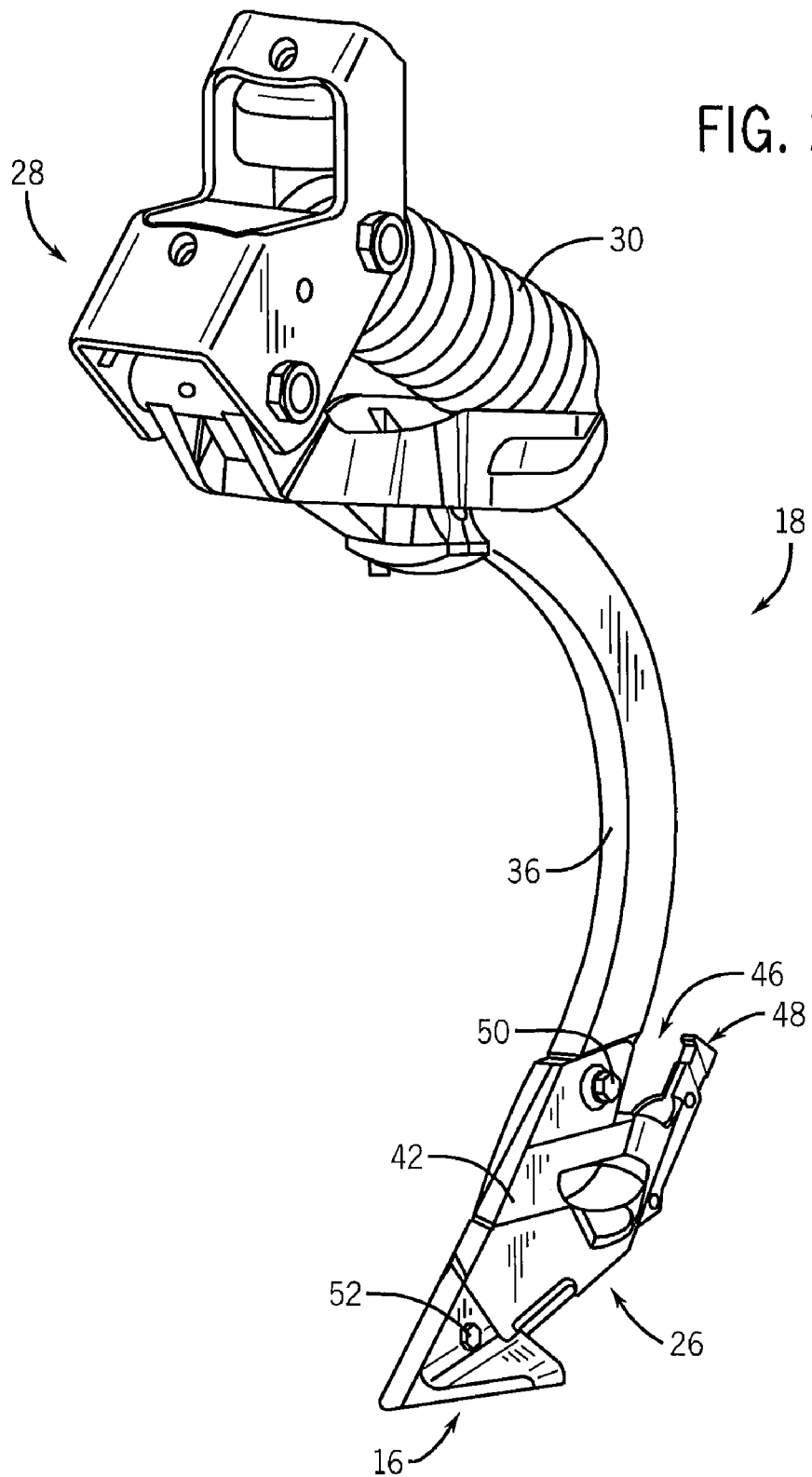
FIG. 2 is an isometric view of a shank assembly according to the present invention.

Referring now to FIG. 2, each sweep 16 is mounted to the shank 18 through an adapter 26 that, as will be described, allows different types of sweeps and other agricultural tools to be coupled to the shank 18. Opposite the adapter 26, the shank 18 is coupled to a mount assembly 28 that enables the shank 18 to be mounted to the implement frame 12. In the illustrated embodiment, the mount assembly 28 includes a spring 30 that is designed to hold the position of the shank 18 and the sweep 16, or other tool mounted to the adapter 26, encounters obstructions, such as rocks or other field debris. It is understood that other types of mounting assemblies may be used.

Figure 3:
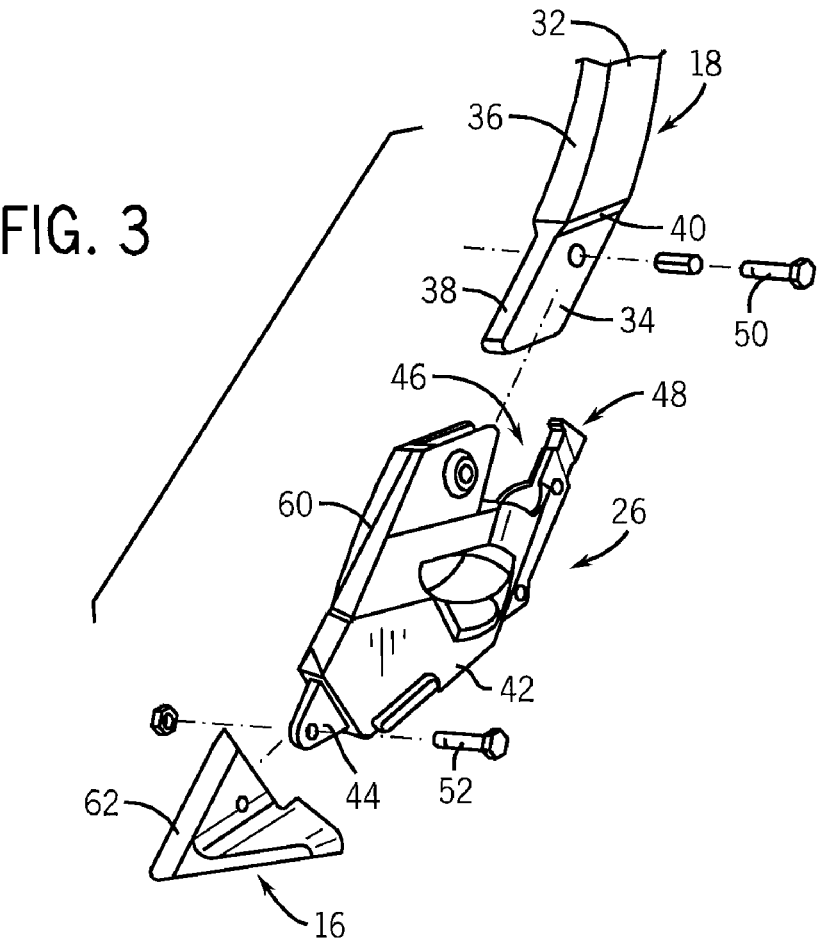
FIG. 3 is an exploded view of a portion of the shank assembly shown in FIG. 2.

As shown in FIG. 3, the shank 18 has an upper portion 32 and a lower, adapter engaging, portion 34. The upper portion 32 and the lower portion 34 each has a leading edge 36 and 38, respectively, but the width of leading edge 38 is less than that of leading edge 36, the importance of which will be described more fully below. The trailing edges, opposite leading edges 36 and 38, are similarly dimensioned resulting in the lower portion 34 being dimensionally smaller than the upper portion 32. In one embodiment, the upper portion 32 and the lower portion 34 interconnect at a tapered portion 40. One skilled in the art will appreciate that in a preferred embodiment, the upper, lower, and tapered portions of the shank 18 are integrally formed in a single unitary construction using known fabrication techniques, such as forging.

The adapter 26 has a main adapter body 42 from which an angled and generally downwardly extending mounting flange 44 extends. As will be described, the flange 44 is used to mount interchangeable plowing and other agricultural tools to the shank 18, such as sweep 16. The main adapter body 42 also includes a shank receiver 46 generally defined in an upper portion of the body 42 opposite the flange 44. The shank receiver 46 is shaped to snuggly receive the lower portion 34 of the shank 18. The adapter body 42 also has a seed tube receiver 48 configured to receive a seed or fertilizer tube (not shown).

After the lower portion 34 of the shank 18 is positioned within the receiver 46, a locking pin 50 may be used to securely fasten the adapter 26 to the shank 18. Similarly, a pin 52 may be used to fasten the sweep 16 to the flange 44.

Figure 4:
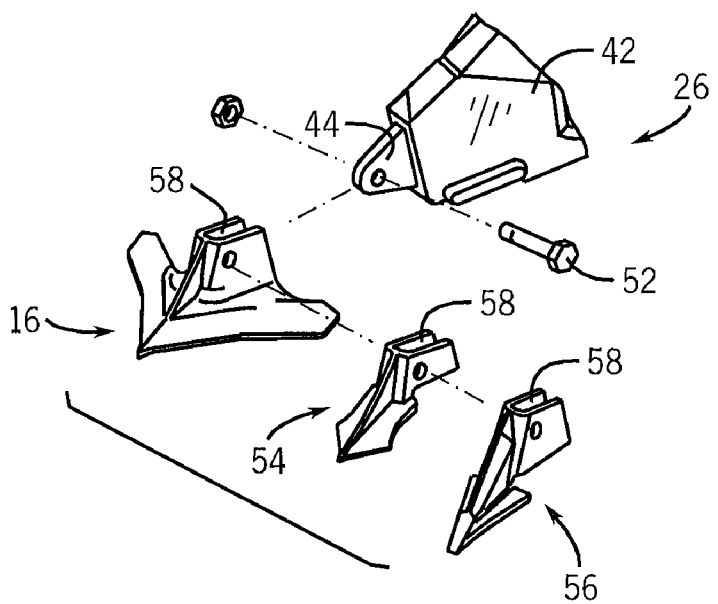
FIG. 4 is an exploded view of a lower portion of the shank assembly and including various tools that may be interchangeably used with the shank assembly.

As noted above, and referring briefly to FIG. 4, the adapter 26 is designed to allow different agricultural devices, such as sweeps, chisel plows, and the like to be interchangeably mounted to the shank 18. In this regard, each tool, illustrated by sweep 16, sweep 54, and spike 56, includes a groove or channel 58 into which the flange 44 is inserted. The aforementioned locking pin 52 may then be used to securely fasten the tool to the adapter 26.

Figure 5:
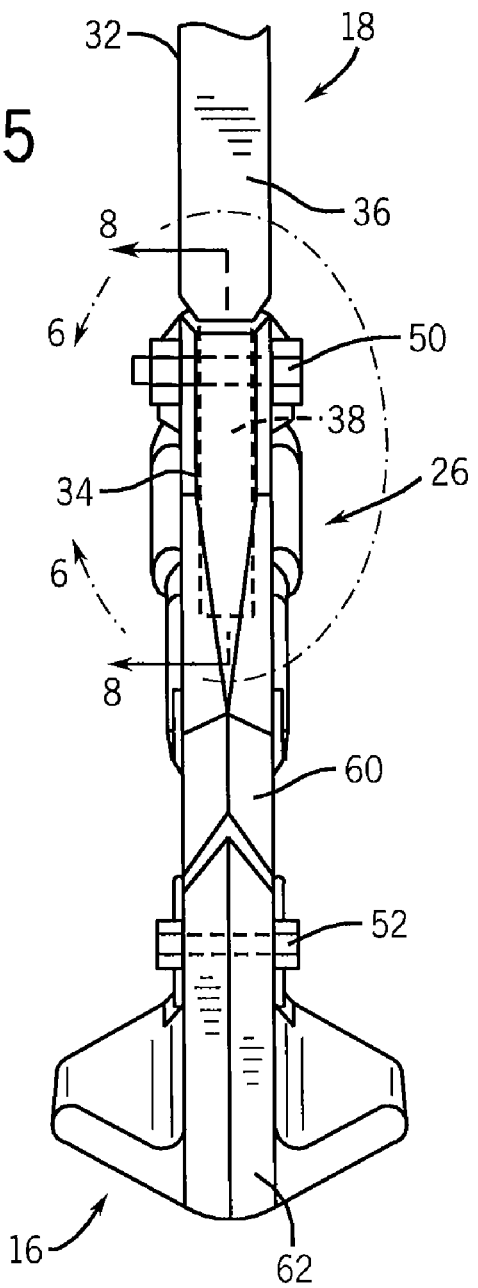
FIG. 5 is a front elevation view of the shank assembly shown in FIG. 2.
Figure 6:
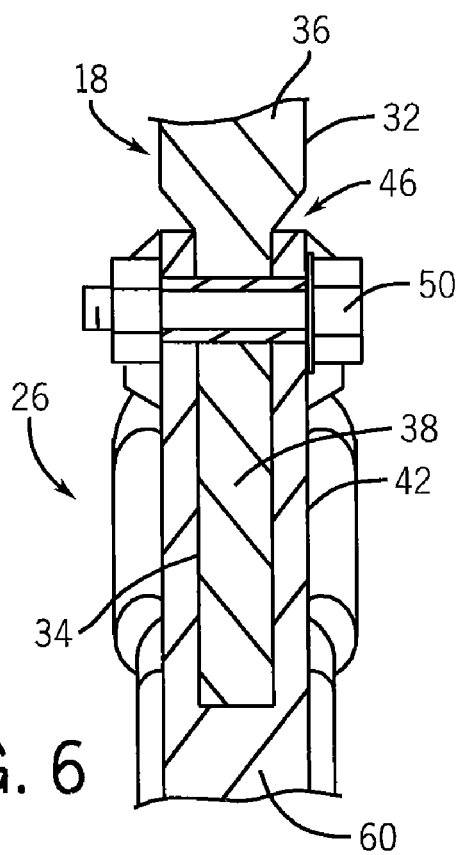
FIG. 6 is an enlarged view of a portion of the shank assembly shown in FIG. 5 corresponding to that designated by line 6-6 of FIG. 5.

Referring now to FIGS. 5 and 6, the lower portion 34 of the shank 18 is received within the receiver 46 of the adapter 26, which has a leading edge 60 similar in width to the leading edge 36 of the upper portion 32 of the shank 18. Thus, when the adapter 26 is coupled to the shank 18, the width of the leading edge defined from the shank 18 down through the adapter 26 is relatively constant. Moreover, the leading edge 62 of the sweep 16 is generally the same width of the leading edges 36 and 60. As such, the leading edge collectively defined by the shank 18, the adapter 26, and the sweep 16 is relatively constant. Preferably, the leading edges of each tool that may be interchangeably coupled to the adapter has a width generally equal to the leading edges 36 and 60. The present inventors have found that maintaining a constant or uniform leading edge width reduces soil disturbance, which reduces moisture loss in the soil as well reduces fuel consumption by the tractor. The present inventors have also found that the present invention provides improved trash flow.

Figure 7:
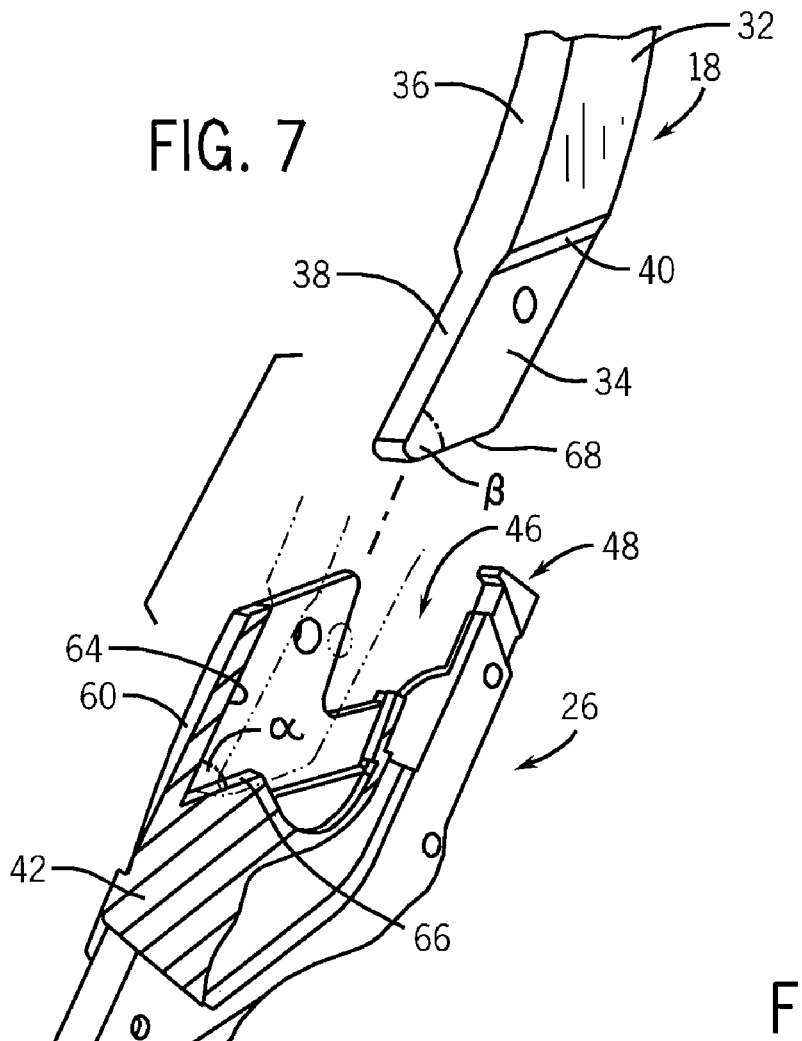
FIG. 7 is a partial exploded view of the shank assembly shown in FIG. 2 with an adapter member used to connect a tool to a shank shown in partial section.
Figure 8:
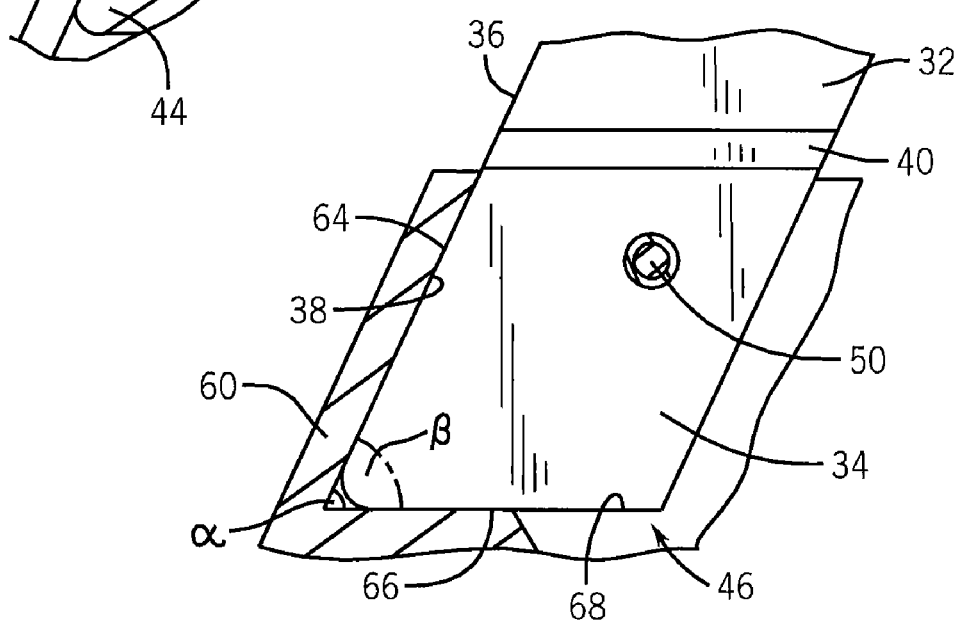
FIG. 8 is a section view of the shank assembly shown in FIG. 5 taken along line 8-8 of FIG. 5.

Referring now to FIGS. 7-8, the receiver 46 is shaped to match the lower portion 34 of the shank 18. More particularly, the receiver 46 is defined by a forward edge 64 opposite the leading edge 60 and a baseline edge 66 that extends inwardly from the forward edge 64 at an angle α that is matched to the angle β that is defined by the leading edge 38 and lower edge 68 of the lower portion 34 of the shank 18. In one embodiment, the angles α, β are between 40-60 degrees and, preferably, approximately 50 degrees. This angling of the edges 60 and 64 advantageously reduces tripping of the adapter 26 and the sweep 16 relative to the shank 18 when ground obstructions are encountered.

It will be appreciated that a tool, such as a sweep, spike, chisel plow or similar tool, having an interior channel may be mounted directly to the shank 18. Preferably, the width of the leading edge of the tool is matched to the width of the leading edge of the shank 18.

Many changes and will modifications could be made to the invention without departing from the spirit thereof. The scope of these changes will become apparent from the appended claims.

We claim:

1. A shank for a towable agricultural implement, comprising:

a shank body having an upper portion for mounting to said towable agricultural implement and a lower portion, the shank body partially defined by a first leading edge having a first width, said shank body is curved between the upper portion and the lower portion;

an adapter having a main adapter body; said adapter having a second leading edge having a second width; said main adapter body having a bore extending through the main adapter body along an axis that is orthogonal to the second leading edge and a mounting flange angled and extending downwardly from said main adapter; said main adapter body having a shank receiver in an upper portion of said main adapter body;

said main adapter body having a seed tube;

a first elongated locking pin adapted to fit into bore to mount said adapter to said shank; and an agricultural tool having a third leading edge having a third width fastens to said mounting flange by a second locking pin;

wherein said third width is generally equal to the first and second width.

2. The shank of claim 1 wherein the adapter has a bottom edge, opposite the shank body, and angled relative to the second leading edge.

3. The shank of claim 2 wherein the bottom edge is angled at angle between approximately 40 and approximately 60 degrees relative to the second leading edge.

4. The shank of claim 3 wherein the angle is approximately 50 degrees.

5. The shank of claim 1 further comprising a tapered portion integrally formed with the shank body and the adapter and defining a transition between the shank body and the adapter.

6. The shank of claim 1 wherein the adapter is formed by forging.

7. An agricultural implement adapted to be towed by a vehicle along an agricultural surface, the implement comprising:

an implement frame having a portion to be hitched to the vehicle;

a plurality of shanks mounted to the frame; and a plurality of tool adapters adapted to be coupled to the plurality of shanks; and wherein each shank comprises:

a shank body having a first end for mounting to the frame and a second end, the second end defining a first footprint; and an adapter mount portion integrally formed with the second end and having a second footprint that is dimensionally equal to said first footprint; said adapter mount portion having a seed tube; and an agricultural tool fastens to said adapter mount.

8. The agricultural implement of claim 7 wherein the shank body has a first leading edge and the adapter mount portion has a second leading edge, wherein the second leading edge is generally aligned with the first leading edge.

9. The agricultural implement of claim 8 wherein the first leading edge has a first width measured along a plane that is generally parallel to the frame and the second leading edge has a second width measured along the plane, wherein the second width is generally equal to the first width.

10. The agricultural implement of claim 8 wherein each adapter mount portion further comprises a lower edge angled relative to the second leading edge, and wherein each tool adapter has a receiver portion that interfaces with the adapter mount portion, each receiver portion having a first receiving edge that interfaces the second leading edge and a second receiving edge that interfaces with the bottom edge when the tool adapter is mounted to a respective adapter mount portion of a respective shank.

11. The agricultural implement of claim 10 wherein the first receiving edge and the second receiving edge prevent the tool adapter from rotating relative to the shank.

12. The agricultural implement of claim 10 wherein the bottom edge is angled at approximately 50 degrees relative to the second leading edge.

13. The agricultural implement of claim 7 wherein the plurality of shanks are pivotably mounted to the frame.

14. The agricultural implement of claim 8 further comprising a plurality of locking pins that secure the plurality of tool adapters to the plurality of shanks.

* * * * *